(12) United States Patent
Nobori

(10) Patent No.: US 8,223,163 B2
(45) Date of Patent: Jul. 17, 2012

(54) DISPLAY DEVICE, PROGRAM, AND INFORMATION STORAGE MEDIUM

(75) Inventor: Tatsuhiko Nobori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 485 days.

(21) Appl. No.: 12/465,246

(22) Filed: May 13, 2009

(65) Prior Publication Data

US 2009/0284544 A1  Nov. 19, 2009

(30) Foreign Application Priority Data

May 14, 2008 (JP) ................................. 2008-126856

(51) Int. Cl.
| | |
|---|---|
| G09G 5/00 | (2006.01) |
| G09G 5/36 | (2006.01) |
| G09G 5/20 | (2006.01) |
| G06K 9/36 | (2006.01) |
| G06K 9/40 | (2006.01) |
| H04N 5/57 | (2006.01) |
| H04N 5/74 | (2006.01) |
| H04N 1/46 | (2006.01) |
| G03F 3/08 | (2006.01) |
| G06K 9/38 | (2006.01) |
| G06K 9/34 | (2006.01) |

(52) U.S. Cl. ........ 345/581; 345/606; 345/690; 345/643; 345/77; 348/673; 348/687; 348/704; 348/672; 358/522; 358/525; 358/448; 382/170; 382/254; 382/168; 382/172

(58) Field of Classification Search .................. 345/426, 345/581, 586, 589–590, 606, 617, 618, 690, 345/643–644, 63, 77; 348/254–256, 365–366, 348/430–431, 602–603, 671–674, 700–704, 687, 710; 382/162, 254, 300, 168–172

See application file for complete search history.

(56) References Cited

U.S. PATENT DOCUMENTS

| 7,911,544 B2 * | 3/2011 | Nobori et al. ................. 348/757 |
|---|---|---|
| 2007/0018951 A1 * | 1/2007 | Nobori et al. ................. 345/156 |

(Continued)

FOREIGN PATENT DOCUMENTS

JP  A-2007-41535  2/2007

(Continued)

*Primary Examiner* — Wesner Sajous
(74) *Attorney, Agent, or Firm* — Oliff & Berridge, PLC

(57) ABSTRACT

A display device includes: a brightness histogram information producing unit that produces brightness histogram information on the basis of an image signal; an APL calculating unit that calculates an APL on the basis of the brightness histogram information; a highest class determining unit that determines a highest class, which is a class with a highest brightness, on the basis of the brightness histogram information; an APL difference value calculating unit that calculates an APL difference value which is a difference value between an APL of a previous frame and an APL of a current frame; and a white peak value determining unit that determines a white peak value of a current frame by adding a predetermined value to a white peak value of a previous frame when a highest class difference absolute value, which is an absolute value of a difference value between a highest class of the previous frame and a highest class of the current frame, is less than a threshold value and that determines a white peak value of the current frame by performing a predetermined operation regardless of a white peak value of the previous frame when the highest class difference absolute value is equal to or larger than the threshold value.

16 Claims, 12 Drawing Sheets

U.S. PATENT DOCUMENTS

| | | | |
|---|---|---|---|
| 2007/0025683 A1* | 2/2007 | Nobori | 385/147 |
| 2007/0285574 A1* | 12/2007 | Nobori | 348/581 |
| 2008/0062125 A1* | 3/2008 | Kitaura | 345/157 |
| 2009/0174636 A1* | 7/2009 | Kohashikawa et al. | 345/87 |
| 2010/0214487 A1* | 8/2010 | Nobori | 348/687 |

FOREIGN PATENT DOCUMENTS

| | | |
|---|---|---|
| JP | A-2007-47244 | 2/2007 |
| JP | A-2007-58167 | 3/2007 |
| JP | A-2008-15225 | 1/2008 |

\* cited by examiner

| CLASS (BRIGHTNESS RANGE, INDEX VALUE) FRAME | F | F+1 | F+2 |
|---|---|---|---|
| 0(0~63, 63) | 5 | 5 | 0 |
| 1(64~127, 127) | 8 | 8 | 8 |
| 2(128~191, 191) | 1 | 1 | 1 |
| 3(192~255, 255) | 1 | 1 | 1 |
| 4(256~319, 319) | 5 | 5 | 5 |
| 5(320~383, 383) | 0 | 0 | 0 |
| 6(384~447, 447) | 0 | 0 | 0 |
| 7(448~511, 511) | 0 | 0 | 0 |
| 8(512~575, 575) | 0 | 0 | 0 |
| 9(576~639, 639) | 2 | 2 | 2 |
| 10(640~703, 703) | 6 | 6 | 6 |
| 11(704~767, 767) | 10 | 10 | 10 |
| 12(768~831, 831) | 8 | 4 | 9 |
| 13(832~895, 895) | 4 | 8 | 8 |
| 14(896~959, 959) | 0 | 0 | 0 |
| 15(960~1023, 1023) | 0 | 0 | 0 |

FIG. 4

| CLASS (BRIGHTNESS RANGE, INDEX VALUE) \ FRAME | s-1 | s | s+1 | s+2 | s+3 |
|---|---|---|---|---|---|
| 0(0~63, 31.5) | 5 | 5 | 5 | 5 | 5 |
| 1(64~127, 95.5) | 8 | 8 | 8 | 7 | 7 |
| 2(128~191, 159.5) | 1 | 1 | 1 | 2 | 2 |
| 3(192~255, 223.5) | 1 | 1 | 1 | 1 | 1 |
| 4(256~319, 287.5) | 0 | 0 | 0 | 0 | 0 |
| 5(320~383, 351.5) | 0 | 0 | 0 | 0 | 0 |
| 6(384~447, 415.5) | 0 | 0 | 0 | 0 | 0 |
| 7(448~511, 479.5) | 0 | 0 | 0 | 0 | 0 |
| 8(512~575, 543.5) | 0 | 0 | 0 | 0 | 0 |
| 9(576~639, 607.5) | 2 | 2 | 2 | 2 | 2 |
| 10(640~703, 671.5) | 6 | 6 | 6 | 6 | 6 |
| 11(704~767, 735.5) | 10 | 10 | 10 | 8 | 10 |
| 12(768~831, 799.5) | 7 | 6 | 9 | 12 | 17 |
| 13(832~895, 863.5) | 10 | 10 | 7 | 7 | 0 |
| 14(896~959, 927.5) | 0 | 1 | 1 | 0 | 0 |
| 15(960~1023, 991.5) | 0 | 0 | 0 | 0 | 0 |
| HistMax(t) | 13 | 14 | 14 | 13 | 12 |
| dHistMax(t) |  | 1 | 0 | -1 | -1 |
| APL(t) | 562.7 | 565.3 | 561.4 | 562.7 | 561.2 |
| dAPL(t) |  | 2.6 | -3.9 | 1.3 | -11.5 |
| α |  | 5 | 3 | 0 | 1 |
| WP(t) | 863 | 876 | 864 | 864 | 853 |

FIG. 8

DISPLAY DEVICE, PROGRAM, AND INFORMATION STORAGE MEDIUM

The entire disclosure of Japanese Patent Application No. 2008-126856 filed May 14, 2008 is expressly incorporated by reference herein.

BACKGROUND

1. Technical Field

The present invention relates to a display device, a program, and an information storage medium.

2. Related Art

An adaptive dimming control in which a brightness range expansion and a dimming control of a lamp are combined has been proposed, for example, as disclosed in JP-A-2007-58167. Generally, in the adaptive dimming control, a brightness range expansion rate or a dimming control rate is calculated on the basis of a white peak value (maximum brightness value), an APL (average picture level), and a brightness histogram. Since an image processing apparatus needs to scan the entire image in order to calculate the white peak value and the like, it ends up increasing in the scale of an image processing circuit. As methods of reducing the scale of the image processing circuit, for example, a method of reducing the number of classes of a brightness histogram (increasing the width of each class), a method of limiting the range to be scanned, and a method of simplifying an image processing operation may be considered.

However, when these methods are used, the scale of the image processing circuit does become smaller but the accuracy will be lowered. In addition, when these methods are used, the estimate of a white peak value is used. However, if the white peak value is estimated dark, so-called halation occurs at the time of display of an image.

SUMMARY

An advantage of some aspects of the invention is that it provides a display device that does not cause halation while suppressing the scale of an image processing circuit, a program, and an information storage medium.

According to an aspect of the invention, there is provided a display device including: a brightness histogram information producing unit that produces brightness histogram information on the basis of an image signal; an APL calculating unit that calculates an APL on the basis of the brightness histogram information; a highest class determining unit that determines a highest class, which is a class with a highest brightness, on the basis of the brightness histogram information; an APL difference value calculating unit that calculates an APL difference value which is a difference value between an APL of a previous frame and an APL of a current frame; and a white peak value determining unit that determines a white peak value of a current frame by adding a predetermined value to a white peak value of a previous frame when a highest class difference absolute value, which is an absolute value of a difference value between a highest class of the previous frame and a highest class of the current frame, is less than a threshold value and that determines a white peak value of the current frame by performing a predetermined operation regardless of a white peak value of the previous frame when the highest class difference absolute value is equal to or larger than the threshold value.

In addition, according to another aspect of the invention, there is provided a program causing a computer to function as: a brightness histogram information producing unit that produces brightness histogram information on the basis of an image signal; an APL calculating unit that calculates an APL on the basis of the brightness histogram information; a highest class determining unit that determines a highest class, which is a class with a highest brightness, on the basis of the brightness histogram information; an APL difference value calculating unit that calculates an APL difference value which is a difference value between an APL of a previous frame and an APL of a current frame; and a white peak value determining unit that determines a white peak value of a current frame by adding a predetermined value to a white peak value of a previous frame when a highest class difference absolute value, which is an absolute value of a difference value between a highest class of the previous frame and a highest class of the current frame, is less than a threshold value and that determines a white peak value of the current frame by performing a predetermined operation regardless of a white peak value of the previous frame when the highest class difference absolute value is equal to or larger than the threshold value.

In addition, according to still another aspect of the invention, there is provided an information storage medium that stores a program readable by a computer stores the above-described program.

Furthermore, the brightness histogram information producing unit produces the brightness histogram information so as to include a plurality of brightness value in each class. According to the aspects of the invention, since the display device calculates the APL using the brightness histogram information in which a plurality of brightness values are included in each class, the scale of the image processing circuit can be suppressed compared with a case where the APL is calculated using brightness histogram information in which a class is set for every brightness value.

Moreover, according to the aspects of the invention, the display device determines the white peak value of the current frame by adding the predetermined value to the white peak value of the previous frame when the highest class difference absolute value is less than the threshold value and determines the white peak value of the current frame by performing the predetermined operation regardless of the white peak value of the previous frame when the highest class difference absolute value is equal to or larger than the threshold value. Thus, since a change of the white peak value can be suppressed when an image does not change largely, occurrence of halation can be suppressed.

Furthermore, the display device may further include an expansion coefficient calculating unit that calculates an expansion coefficient on the basis of the APL of the current frame and the white peak value of the current frame.

In this case, the display device can perform appropriate expansion in a state where occurrence of halation is suppressed.

Furthermore, the display device may further include a dimming coefficient calculating unit that calculates a dimming coefficient on the basis of the APL of the current frame and the white peak value of the current frame.

In this case, the display device can perform an appropriate dimming control in a state where occurrence of halation is suppressed.

Furthermore, the display device may further include a dimming coefficient calculating unit that calculates a dimming coefficient on the basis of the expansion coefficient.

In this case, the display device can reduce the operation amount in calculating the dimming coefficient by performing the operation on the basis of the expansion coefficient.

Furthermore, the display device may further include an expansion coefficient calculating unit that calculates an expansion coefficient on the basis of the dimming coefficient.

In this case, the display device can reduce the operation amount in calculating the expansion coefficient by performing the operation on the basis of the dimming coefficient.

Furthermore, the white peak value determining unit may apply, as the predetermined value, a value obtained by multiplying the APL difference value by a coefficient α.

In this case, since the display device can make a value according to the change of the APL reflected in the change of the white peak value, occurrence of halation can be suppressed.

Furthermore, the white peak value determining unit may determine the white peak value of the current frame by applying a different value as the coefficient α according to combination of a highest class difference value, which is a difference value between a highest class of a previous frame and a highest class of a current frame, and the APL difference value.

In this case, since the display device can make a value according to the change of the highest class and the change of the APL reflected in the change of the white peak value, occurrence of halation can be suppressed.

Furthermore, the white peak value determining unit may apply α0 as the coefficient α when the highest class difference value is 0 or more and the APL difference value is 0 or more, apply α1 as the coefficient α when the highest class difference value is 0 or more and the APL difference value is less than 0, apply 0 as the coefficient α when the highest class difference value is less than 0 and the APL difference value is 0 or more, and apply α2 as the coefficient α when the highest class difference value is less than 0 and the APL difference value is less than 0 (where, α0>α1>α2).

In this case, since the display device can prevent the white peak value from becoming too small, the amount of correction does not become excessive and an image after correction does not become too bright. As a result, occurrence of halation can be suppressed.

Furthermore, the white peak value determining unit may apply α3 as the coefficient α when the APL difference value is larger than 0 and the highest class difference value is larger than 0, apply α4 as the coefficient α when the APL difference value is larger than 0 and the highest class difference value is 0 or less, apply 0 as the coefficient α when the APL difference value is 0 or less and the highest class difference value is larger than 0, and apply α5 as the coefficient α when the APL difference value is 0 or less and the highest class difference value is 0 or less (where, α3>α4>α5).

In this case, since the display device can prevent the white peak value from becoming too small, the amount of correction does not become excessive and an image after correction does not become too bright. As a result, occurrence of halation can be suppressed. Furthermore, in this case, the dimmer control unit can further stabilize the white peak value.

Furthermore, the APL calculating unit may calculate a value obtained by dividing the sum of values, which are obtained by multiplication of index values of classes whose frequencies are 1 or more and the frequencies of the classes, by the sum of the frequencies as the APL on the basis of the brightness histogram information.

In this case, since the display device can calculate the APL easily, the scale of the image processing circuit can be suppressed.

Furthermore, the APL calculating unit may calculate the APL by using as the index value a maximum brightness value of each class whose frequency is 1 or more.

In this case, since the display device can determine a large APL using the maximum brightness value as an index value, an image after correction does not become too bright. As a result, occurrence of halation can be suppressed.

BRIEF DESCRIPTION OF THE DRAWINGS

The invention will be described with reference to the accompanying drawings, wherein like numbers reference like elements.

FIG. 4 is a view illustrating an example of the frequency for every class of a brightness histogram in the first embodiment.

FIG. 8 is a view illustrating an example of the frequency for every class of a brightness histogram in a second embodiment.

DESCRIPTION OF EXEMPLARY EMBODIMENTS

Hereinafter, embodiments of the invention applied to a projector will be described with reference to the accompanying drawings. In addition, the embodiments shown below do not limit the contents of the invention described in the appended claims. Moreover, all configurations shown in the following embodiments are not necessarily indispensable as a solving means in the invention described in the appended claims.

First Embodiment

Figure 1:
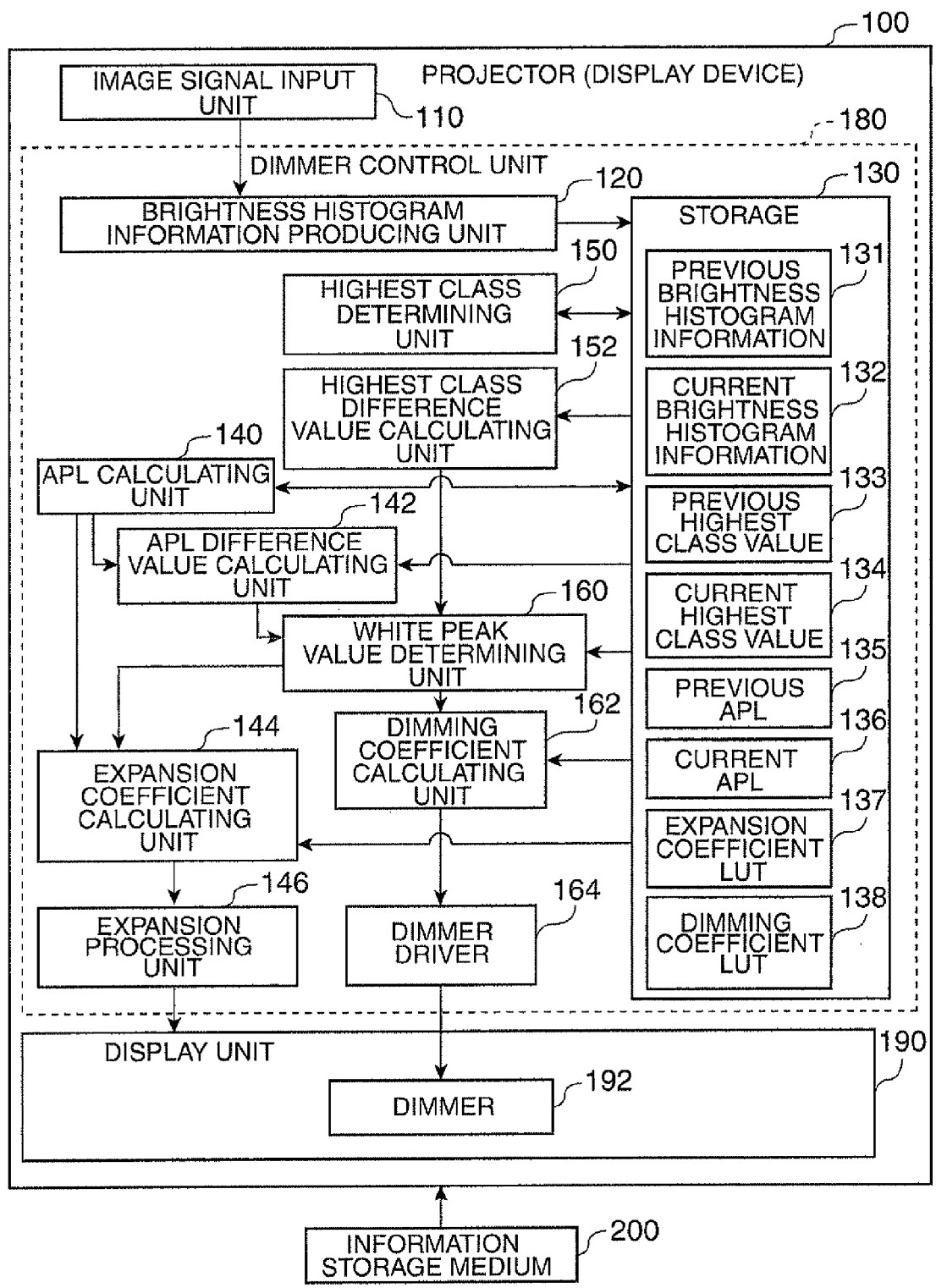
FIG. 1 is a functional block diagram of a projector according to a first embodiment.

FIG. 1 is a functional block diagram of a projector 100 according to a first embodiment. The projector 100 that is an example of a display device is configured to include an image signal input unit 110 to which an image signal (for example, a moving image signal such as an RGB signal) is input, a dimmer control unit 180, and a display unit 190 having a dimmer 192.

In addition, the dimmer control unit 180 is configured to include: a brightness histogram information producing unit 120 that produces brightness histogram information indicating a brightness histogram on the basis of an image signal; a storage 130 that stores various kinds of information; an APL calculating unit 140 that calculates an APL (average picture level) on the basis of the brightness histogram information;

and an APL difference value calculating unit 142 that calculates a difference value (APL difference value) between a previous APL 135 (APL of a last frame) and a current APL 136 (APL of a current frame).

Furthermore, the dimmer control unit 180 is configured to include: a highest class determining unit 150 that determines a highest class, which is a class with a highest brightness, on the basis of the brightness histogram information; a highest class difference value calculating unit 152 that calculates an absolute value (highest class difference absolute value) of a difference value between a previous highest class value 133 (highest class value of a last frame) and a current highest class value 134 (highest class value of a current frame); and a white peak value determining unit 160 that determines a white peak value of a current frame by adding a predetermined value to a white peak value of a previous frame when the highest class difference absolute value is less than a threshold value and that determines a white peak value of a current frame by performing a predetermined operation regardless of a white peak value of a previous frame when the highest class difference absolute value is equal to or larger than the threshold value.

Furthermore, the dimmer control unit 180 is configured to include: an expansion coefficient calculating unit 144 that calculates an expansion coefficient on the basis of the current APL 136 and the white peak value of the current frame; a dimming coefficient calculating unit 162 that calculates a dimming coefficient on the basis of the current APL 136 and the white peak value of the current frame; an expansion processing unit 146 that executes expansion processing on the basis of the expansion coefficient and an image signal; and a dimmer driver 164 that controls the dimmer 192 on the basis of the dimming coefficient.

In addition, the storage 130 stores previous brightness histogram information 131 that is brightness histogram information on a last frame, current brightness histogram information 132 that is brightness histogram information on a current frame, the previous highest class value 133, the current highest class value 134, the previous APL 135, the current APL 136, an expansion coefficient LUT 137, a dimming coefficient LUT 138, and the like. The expansion coefficient LUT 137 and the dimming coefficient LUT 138 will be described later.

In addition, the following things may be adopted as hardware for realizing the function of each of the units. For example, an input port or the like may be adopted as the image signal input unit 110, and a CPU, a RAM, or the like may be adopted as the brightness histogram information producing unit 120. A CPU or the like may be adopted as the APL calculating unit 140, the APL difference value calculating unit 142, the expansion coefficient calculating unit 144, the highest class determining unit 150, the highest class difference value calculating unit 152, the white peak value determining unit 160, the dimming coefficient calculating unit 162, and the dimmer driver 164. An image processing circuit or the like may be adopted as the expansion processing unit 146. A lamp power supply unit (having a function of adjusting the brightness of a lamp by power control), a light shielding plate (having a function of blocking output light), a liquid crystal light valve (having a function of blocking output light), or the like may be adopted as the dimmer 192. A liquid crystal light valve, a light source, a liquid crystal driving driver, or the like may be adopted as the display unit 190.

In addition, the projector 100 (dimmer control unit 180) may realize the function of each of the units by reading a program from an information storage medium 200. For example, a CD-ROM, a DVD-ROM, a ROM, a RAM, and an HDD may be applied as the information storage medium 200, and the program reading method may be a contact method or a non-contact method.

Figure 2:
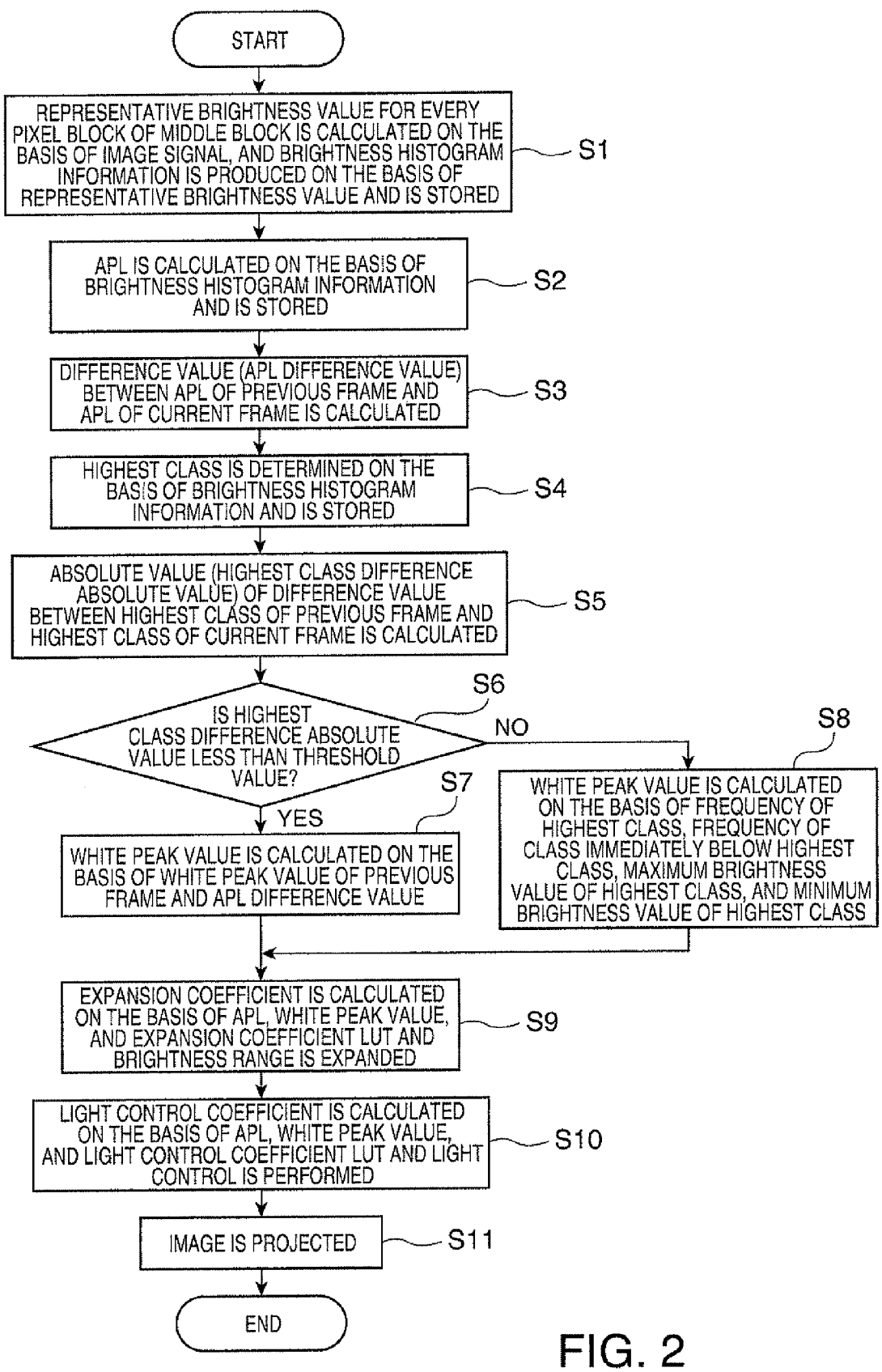
FIG. 2 is a flow chart illustrating the flow of image processing in the first embodiment.

Next, flow of image processing using the units will be described. FIG. 2 is a flow chart illustrating the flow of image processing in the first embodiment.

The brightness histogram information producing unit 120 calculates a representative brightness value (for example, an average brightness value) for every pixel block of a middle block of an image (one frame) on the basis of an image signal, produces brightness histogram information on the basis of the representative brightness value, and stores the brightness histogram information as current brightness histogram information 132 in the storage 130 (step S1). In addition, the original current brightness histogram information 132 may become the previous brightness histogram information 131 by FIFO, for example, or the original current brightness histogram information 132 may be stored as the previous brightness histogram information 131 in the storage 130 when the brightness histogram information producing unit 120 stores the new current brightness histogram information 132.

Figure 3:
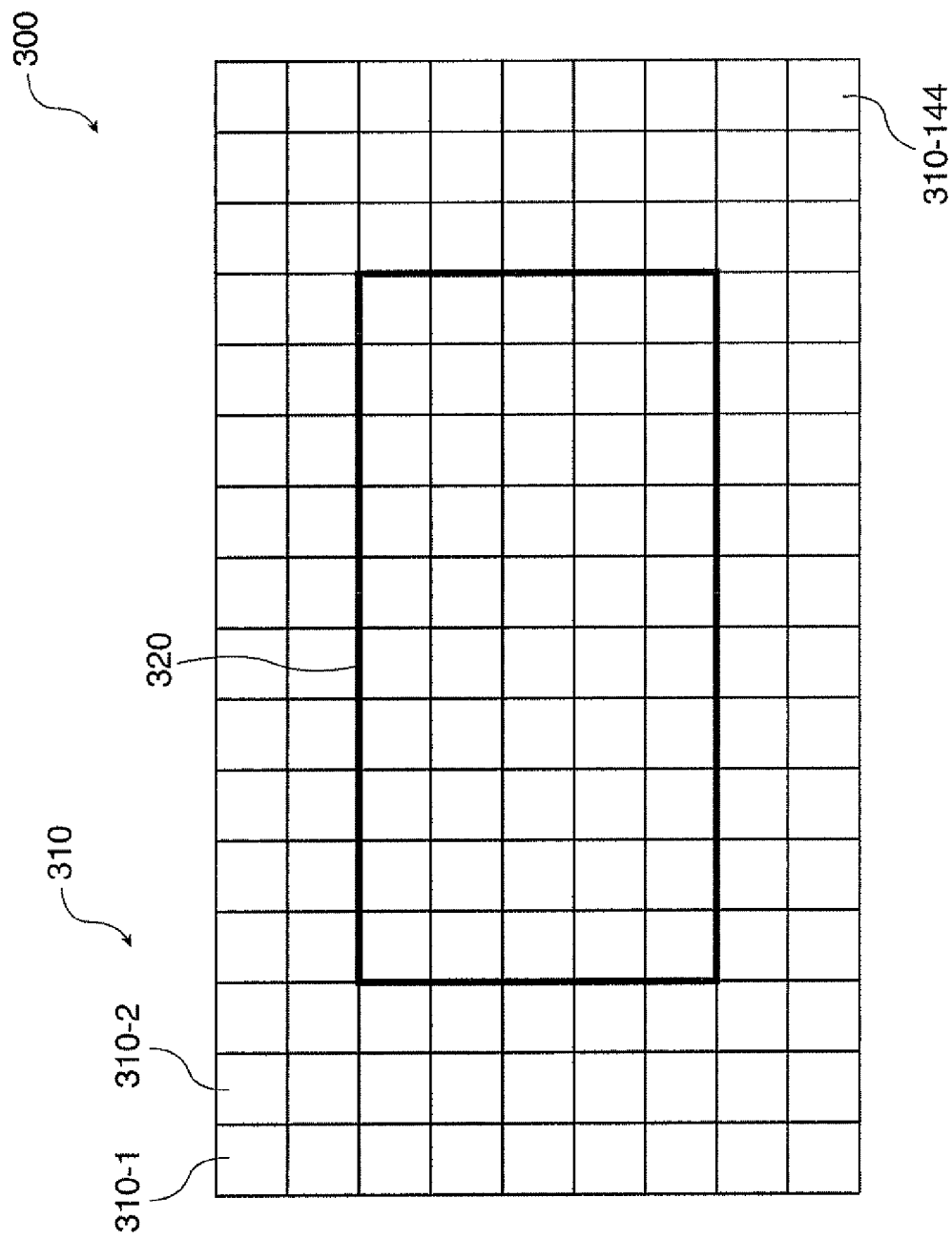
FIG. 3 is a view illustrating an example of the relationship of an image, a middle block, and a pixel block in the first embodiment.

FIG. 3 is a view illustrating an example of the relationship of an image 300, a middle block 320, and a pixel block 310 in the first embodiment. For example, in the case of the image 300 that has 1280 pixels in the horizontal direction and 720 pixels in the vertical direction, the brightness histogram information producing unit 120 divides the image 300 into 144 pixel blocks (16 pixel blocks in the horizontal direction×9 pixel blocks in the vertical direction) 310-1 to 310-144. In addition, the brightness histogram information producing unit 120 calculates a representative brightness value for the 50 pixel blocks 310 of the middle block 320 excluding the two top and bottom lines and the three left and right columns of the outer pixel blocks 310.

In this case, one pixel block 310 is configured to include 80 pixels. The brightness histogram information producing unit 120 stores a value obtained by averaging brightness values of pixels included in the pixel block 310, as a representative brightness value of the pixel block 310, in the RAM or the like. Moreover, for example, a maximum value of each signal value of RGB may be adopted as the brightness value or the total of 0.299×R signal value, 0.587×G signal value, and 0.144×B signal value may be adopted as the brightness value. In addition, the representative brightness value is not limited to the average brightness value and, for example, may be a brightness value (representative value) of a pixel near the middle of the pixel block 310.

In addition, the brightness histogram information producing 120 determines to which class of the brightness histogram the representative brightness value of each pixel block 310 of the middle block 320 belongs and produces brightness histogram information. In addition, the brightness histogram information is information indicating the frequency for every class in one frame, for example.

FIG. 4 is a view illustrating an example of the frequency for every class of the brightness histogram in the first embodiment. For example, in the present embodiment, a brightness value is expressed in 10 bits and values of 0 to 1023 may be adopted as the brightness value. Moreover, in the present embodiment, the brightness range is divided into 16 classes. For example, a case where the brightness value is 0 to 63 corresponds to the class 0, a case where the brightness value is 64 to 127 corresponds to the class 1, and a case where the brightness value is 960 to 1023 corresponds to the class 15.

For example, in the example shown in FIG. 4, the frequency of the class 12 is 8 and the frequency of the class 13 is 4 in a frame F, the frequency of the class 12 is 4 and the frequency of the class 13 is 8 in a frame F+1 (frame immediately after the frame F), and the frequency of the class 12 is 9 and the frequency of the class 13 is 8 in a frame F+2 (frame after two frames from the frame F).

The APL calculating unit 140 calculates an APL on the basis of the current brightness histogram information 132 and stores the APL as the current APL 136 in the storage 130 (step S2). In addition, the original current APL 136 may become the previous APL 135 by FIFO, for example, or the original current APL 136 may be stored as the previous APL 135 in the storage 130 when the APL calculating unit 140 stores the new current APL 136.

For example, the APL calculating unit 140 calculates the APL by the following operation expression.

$$APL(t) = \frac{1}{\sum_{n=0}^{N-1} H(n,t)} \sum_{n=0}^{N-1} \{H(n,t) f(n)\}$$

Here, H(n, t) is the frequency of a class n in a frame t, f(n) is an index value of the class n, and N is the number of classes (here, 16). For example, the index value is a middle brightness value (for example, 31.5 in the class 0) of each class or a maximum brightness value (for example, 63 in the class 0) of each class.

For example, when the index value is a maximum brightness value of each class, the APL is 535 (535.32) in the frame F, the APL is 540 (540.44) in the frame F+1, and the APL is 617 (617.24) in the frame F+2.

The APL difference value calculating unit 142 calculates a difference value dAPL(t) between the previous APL 135 and the current APL 136 (step S3). For example, dAPL(t)=540−535=5 when a current frame is the frame F+1, and dAPL(t)=617−540=77 when a current frame is the frame F+2.

The highest class determining unit 150 determines the highest class on the basis of the current brightness histogram information 132 and stores the highest class as the current highest class value 134 in the storage 130 (step S4). In addition, the original current highest class value 134 may become the previous highest class value 133 by FIFO, for example, or the original current highest class value 134 may be stored as the previous highest class value 133 in the storage 130 when the highest class determining unit 150 stores the new current highest class value 134.

The highest class difference value calculating unit 152 calculates a highest class difference absolute value which is an absolute value of a difference value between the previous highest class value 133 and the current highest class value 134 (step S5). For example, when a current frame is t+1 in the example shown in FIG. 4, the highest class difference absolute value is 0 since both the previous highest class value 133 and the current highest class value 134 are 13.

The white peak value determining unit 160 determines whether or not the highest class difference absolute value is less than a threshold value (for example, 2) (step S6).

When the highest class difference absolute value is less than the threshold value, the white peak value determining unit 160 calculates a white peak value on the basis of a white peak value of the previous frame and an APL difference value of the current frame (step S7). Specifically, the white peak value determining unit 160 determines the white peak value by an operation of WP(t)=WP(t−1)+αdAPL(t), for example.

Here, WP(t) is a white peak value of a current frame, WP(t−1) is a white peak value of a previous framer and α is a constant (for example, 3). Moreover, it is assumed that WP(t−1) APL (t) in the case of a first frame.

For example, when F+2 shown in FIG. 4 is a current frame t and a third frame, WP(t−1)=535+3×5=550 and WP(t)=550+3×77=781.

On the other hand, when the highest class difference absolute value is equal to or larger than the threshold value, the white peak value determining unit 160 calculates a white peak value on the basis of the frequency of a highest class, the frequency of a class immediately below the highest class, a maximum brightness value of the highest class, and a minimum brightness value of the highest class (step S8). Specifically, the white peak value determining unit 160 calculates a white peak value using the following operation expression, for example.

$$dWP(t)=K\{H(HistMax(t),t)-H(HistMax(t)-1,t)/H(HistMax(t),t)\}$$

$$WP(t)=(RMax(t)+RMin(t))/2+dWP(t)$$

Here, K is a constant (for example, 100), RMax(t) is a maximum brightness value of the highest class of the current frame, and RMin(t) is a minimum brightness value of the highest class of the current frame. In addition, dWP(t) is an integral value equal to or larger than −32 and less than 32. In addition, the reason why the range is set to be equal to or larger than −32 and less than 32 is because the width of a class is 64, and any value may be applied for dWP(t) according to the width of a class applied.

For example, when F+1 shown in FIG. 4 is a current frame, dWP(t)=100{(8−4)/8}=50, which exceeds the maximum value of dWP(t). Accordingly, dWP(t) is 31, and WP(t)=(895+832)/2+31=894.5 which is rounded off to become 895.

Moreover, for example, when F+2 shown in FIG. 4 is a current frame, dWP(t)=100{(8−9)/8}=−12.5 and WP(t)=(895+832)/2−12.5=851.

The expansion coefficient calculating unit 144 calculates an expansion coefficient on the basis of the APL of the current frame, the white peak value of the current frame, and the expansion coefficient LUT 137 and the expansion processing unit 146 expands the brightness range on the basis of the expansion coefficient (step S9).

Figure 5:
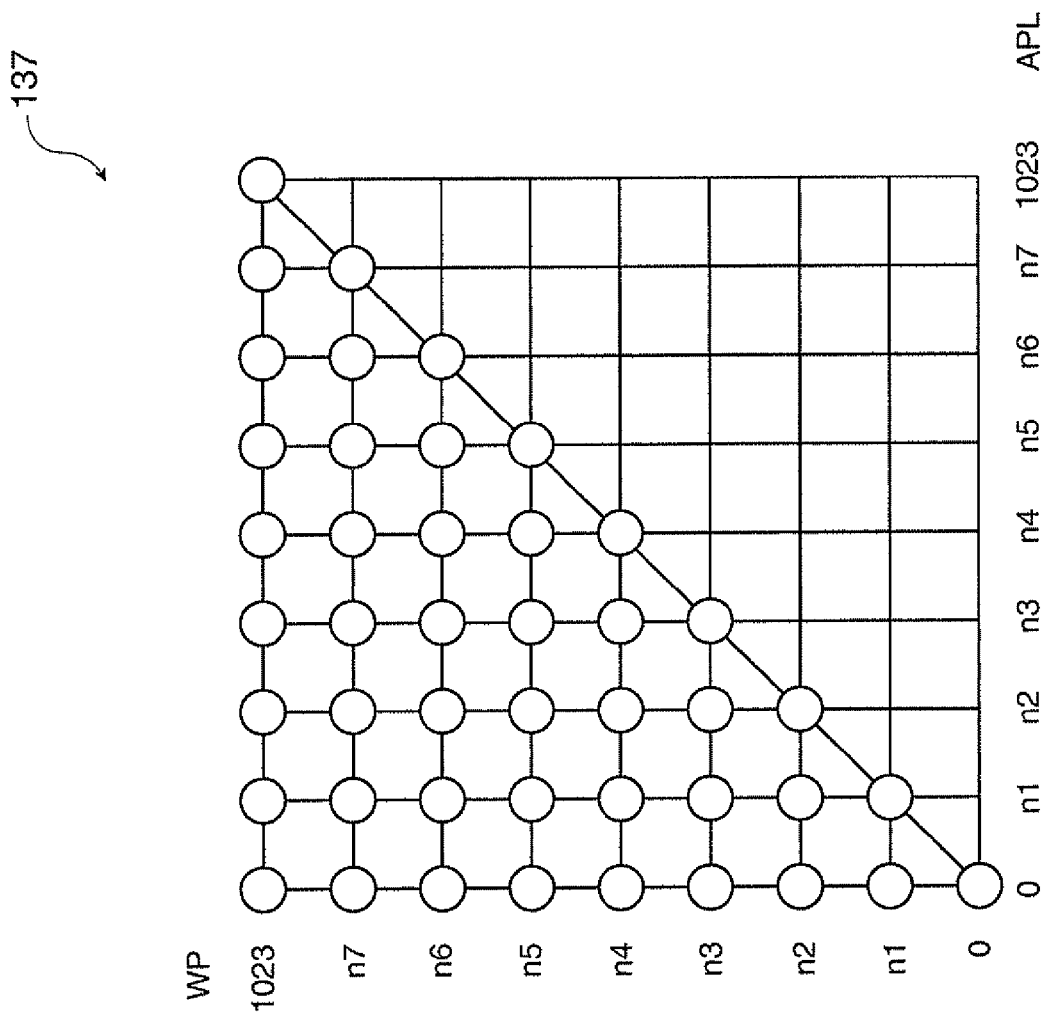
FIG. 5 is a view illustrating an example of an expansion coefficient LUT in the first embodiment.
Figure 6:
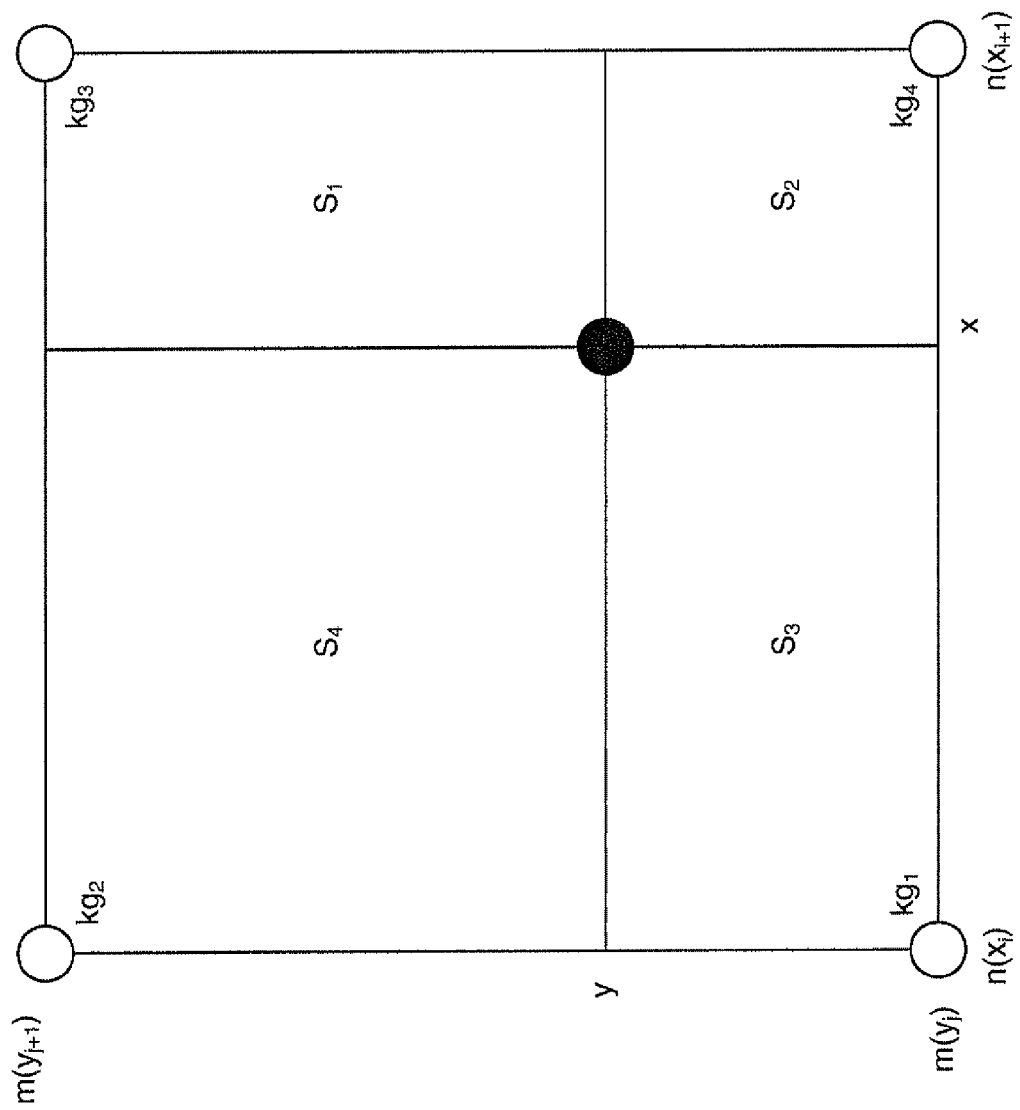
FIG. 6 is a view illustrating a case where four points are defined in the expansion coefficient LUT in the first embodiment.
Figure 7:
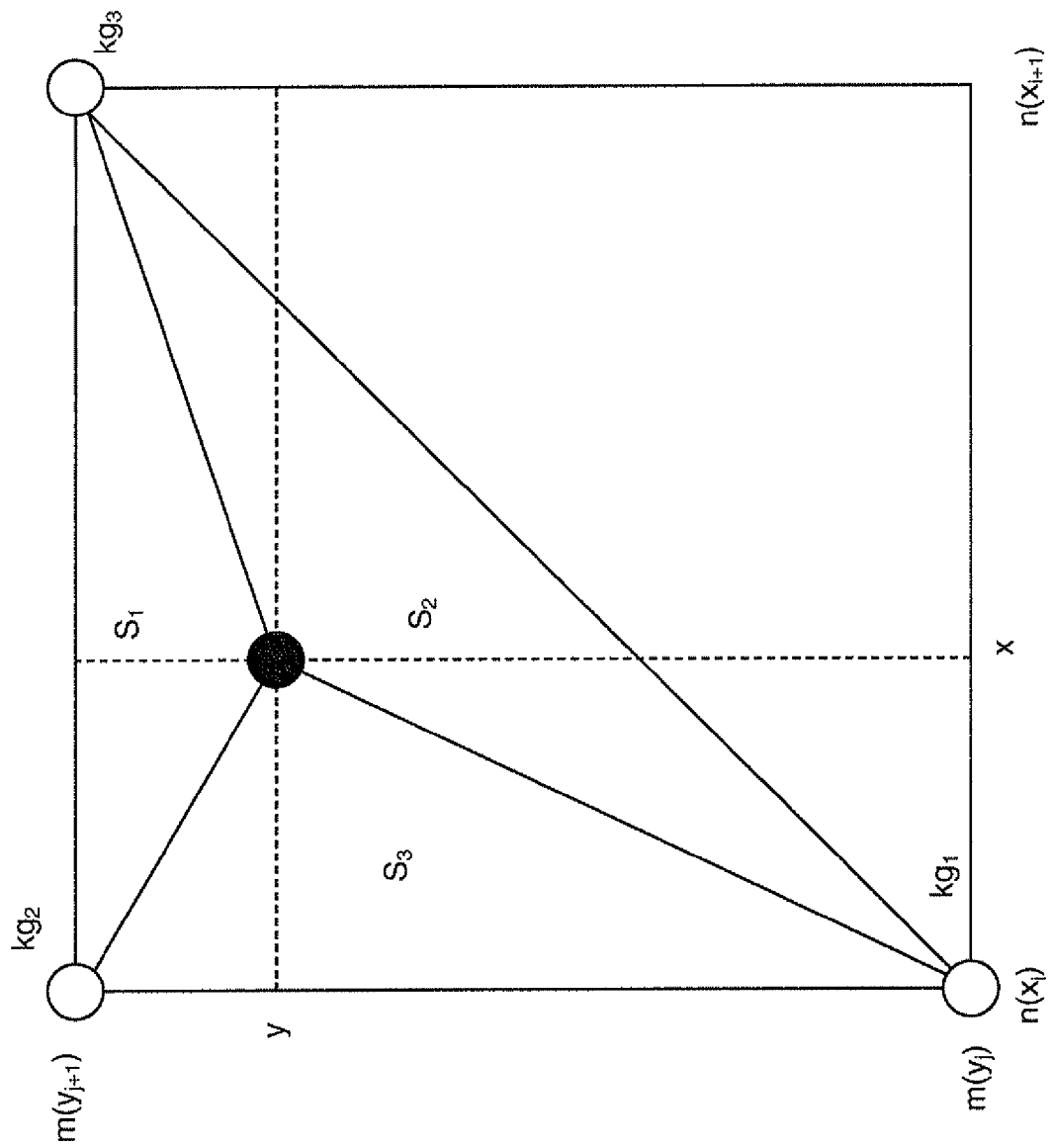
FIG. 7 is a view illustrating a case where three points are defined in the expansion coefficient LUT in the first embodiment.

FIG. 5 is a view illustrating an example of the expansion coefficient LUT 137 in the first embodiment. In addition, FIG. 6 is a view illustrating a case where four points are defined in the expansion coefficient LUT 137 in the first embodiment. In addition, FIG. 7 is a view illustrating a case where three points are defined in the expansion coefficient LUT 137 in the first embodiment.

Moreover, in FIG. 5, the reason why values are not defined on the lower right side is because the average value (APL) does not exceed the maximum value (white peak value). In addition, the dimming coefficient LUT 138 has the same structure as the expansion coefficient LUT 137.

In the projector 100, the storage capacity for storing the expansion coefficient LUT 137 and the dimming coefficient LUT 138 can be suppressed by using the expansion coefficient LUT 137 and the dimming coefficient LUT 138.

Moreover, for example, when the APL is 400 and the white peak value is 500, the expansion coefficient corresponds to a portion within a region defined by four points. In this case, the expansion coefficient calculating unit 144 calculates an expansion coefficient kg by an operation of (kg1S1+kg2S2+kg3S3+kg4S4)/(S1+S2+S3+S4), as shown in FIG. 6.

Moreover, for example, when the APL is 540 and the white peak value is 550, the expansion coefficient corresponds to a portion within a region defined by three points. In this case, the expansion coefficient calculating unit 144 calculates the expansion coefficient kg by an operation of (kg1S1+kg2S2+kg3S3)/(S1+S2+S3), as shown in FIG. 7.

Thus, the expansion coefficient calculating unit 144 can calculate the expansion coefficient kg by performing an interpolation operation even for a value that is not defined in the expansion coefficient LUT 137.

Furthermore, in the expansion coefficient LUT 137, when the white peak value is small, a large value compared with a case where the white peak value is large is set. When the APL is small, a large value compared with a case where the APL is large is set. Thus, when the image 300 is bright, the expansion coefficient LUT 137 is configured such that the expansion coefficient becomes small.

In addition, the dimming coefficient calculating unit 162 calculates a dimming coefficient (for example, an aperture ratio of a light shielding plate) on the basis of the APL, the white peak value, and the dimming coefficient LUT 138 and the dimmer driver 164 drives the dimmer 192 on the basis of the dimming coefficient to thereby perform a dimming control (step S10). In addition, since a method of calculating the dimming coefficient is the same as the above-described method of calculating the expansion coefficient, the explanation is omitted.

The display unit 190 projects an image in a state where the brightness of the image signal is adjusted and the light controlled by the dimmer 192 is adjusted (step S11).

As described above, according to the present embodiment, the projector 100 can suppress the scale of the image processing circuit by calculating the APL using brightness histogram information, in which a plurality of brightness values are included in each class, compared with a case where the APL is calculated using brightness histogram information in which a class is set for every brightness value.

Moreover, according to the present embodiment, the projector 100 determines a white peak value of the current frame by adding a predetermined value to a white peak value of the previous frame when the highest class difference absolute value is less than a threshold value and determines the white peak value of the current frame by performing a predetermined operation regardless of the white peak value of the previous frame when the highest class difference absolute value is equal to or larger than the threshold value. Thus, since a change of the white peak value can be suppressed when an image does not change largely, occurrence of halation can be suppressed.

Furthermore, in the projector 100, a value obtained by multiplying the APL difference value by the coefficient $\alpha$ can be applied as the predetermined value. Accordingly, since a value according to the change of the APL can be reflected in the change of the white peak value, occurrence of halation can be suppressed.

Furthermore, in the projector 100, the APL can be easily calculated by calculating a value obtained by dividing the sum of values, which are obtained by multiplication of index values of classes whose frequencies are 1 or more and the frequencies of the classes, by the sum of the frequencies as the APL on the basis of brightness histogram information. Accordingly, the scale of the image processing circuit can be suppressed.

Furthermore, in the projector 100, a large APL can be determined by calculating an APL using a maximum brightness value of each class whose frequency is 1 or more as an index value. Accordingly, since an image after correction does not become too bright, occurrence of halation can be suppressed.

Second Embodiment

Although the projector 100 calculates the white peak value regardless of the highest class difference value or the APL difference value in step S7 of the first embodiment, the white peak value may also be calculated by applying a different value as a according to these values.

For example, when the highest class difference value is 0 or more and the APL difference value is 0 or more, $\alpha=\alpha 0$. When the highest class difference value is 0 or more and the APL difference value is less than 0, $\alpha=\alpha 1$. When the highest class difference value is less than 0 and the APL difference value is 0 or more, $\alpha=0$. When the highest class difference value is less than 0 and the APL difference value is less than 0, $\alpha=\alpha 2$. In addition, $\alpha 0 > \alpha 1 > \alpha 2$.

FIG. 8 is a view illustrating an example of the frequency for every class of a brightness histogram in the second embodiment. Here, it is assumed that $\alpha 0=5$, $\alpha 1=3$, and $\alpha 2=1$ and the white peak value WP (t) of a frame s−1 is 863, for example.

In this case, in the frame s, the highest class difference value is 0 or more and the APL difference value is 0 or more. Accordingly, $\alpha=\alpha 0=5$ and the white peak value becomes 863+5×2.6=876. In addition, in the frame s+1, the highest class difference value is 0 or more and the APL difference value is less than 0. Accordingly, $\alpha=\alpha 1=3$ and the white peak value becomes 876+3×(−3.9)=864. In addition, in the frame s+2, the highest class difference value is less than 0 and the APL difference value is 0 or more. Accordingly, $\alpha=0$ and the white peak value becomes 864+0×1.3=864. In addition, in the frame s+2, the highest class difference value is less than 0 and the APL difference value is less than 0. Accordingly, $\alpha=\alpha 2=1$ and the white peak value becomes 864+1×(−11.5)=853.

When the highest class difference value is 0 or more and the APL difference value is 0 or more, the image is definitely bright compared with the previous frame. Accordingly, the projector 100 can increase the white peak value by setting a large coefficient as $\alpha$.

In addition, when the highest class difference value is 0 or more and the APL difference value is less than 0, a part of the image is bright compared with the previous frame but the entire image is dark. Accordingly, the projector 100 can slightly increase the white peak value by setting a coefficient smaller than $\alpha 0$ as $\alpha$.

In addition, when the highest class difference value is less than 0 and the APL difference value is 0 or more, a part of the image is dark compared with the previous frame but the entire image is bright. This is a situation where a change of the image is difficult to be predicted. In this case, the projector 100 can make the white peak value not changed compared with the previous frame by setting 0 as $\alpha$.

In addition, when the highest class difference value is less than 0 and the APL difference value is less than 0, the image is definitely dark compared with the previous frame. Accordingly, the projector 100 can slightly change the white peak value compared with the previous frame by setting a coefficient smaller than $\alpha 1$ as $\alpha$.

As described above, according to the present embodiment, the projector 100 can detect the change of an image on the basis of the highest class difference value and the APL difference value. Therefore, since it is possible to prevent the brightness range from excessively expanding by setting a coefficient according to the change of the image, occurrence of halation can be prevented more appropriately.

Third Embodiment

Setting of a coefficient based on the highest class difference value and the APL difference value is not limited to the second embodiment, but various modifications thereof may also be made. For example, the projector 100 may set α=α3 when the APL difference value is larger than 0 and the highest class difference value is larger than 0, α=α4 when the APL difference value is larger than 0 and the highest class difference value is 0 or less, α=0 when the APL difference value is 0 or less and the highest class difference value is larger than 0, and α=α5 when the APL difference value is 0 or less and the highest class difference value is 0 or less. In addition, α3>α4>α5. For example, α3=5, α4=3, and α5=1.

In this case, in the example shown in FIG. 8, white peak values are as follows. In the frame s, α is 5 and the white peak value is 876. In the frame s+1, α is 0 and the white peak value is 876. In the frame s+2, α is 3 and the white peak value is 880. In the frame s+3, α is 1 and the white peak value is 853. As can be seen from comparison with the second embodiment, the white peak values are large compared with those in the second embodiment. Accordingly, the projector 100 can prevent occurrence of halation more appropriately.

Moreover, since a change of the highest class occurs less frequently, the highest class difference value is 0 in many cases and it is easy to follow the change to the APL in the second embodiment. However, since α0(5) or α1(3) is set as α in many cases, a change of a white peak value becomes easily large. In contrast, in the third embodiment, α4(3) or α5(1) is set as α in many cases. Accordingly, since the change of a white peak value becomes smaller than that in the second embodiment, the projector 100 can stabilize a white peak value.

Fourth Embodiment

The configuration of the dimming coefficient calculating unit is not limited to the configuration where the dimming coefficient is calculated on the basis of the APL of the current frame and the white peak value of the current frame but may be a configuration where the dimming coefficient is calculated on the basis of an expansion coefficient.

Figure 9:
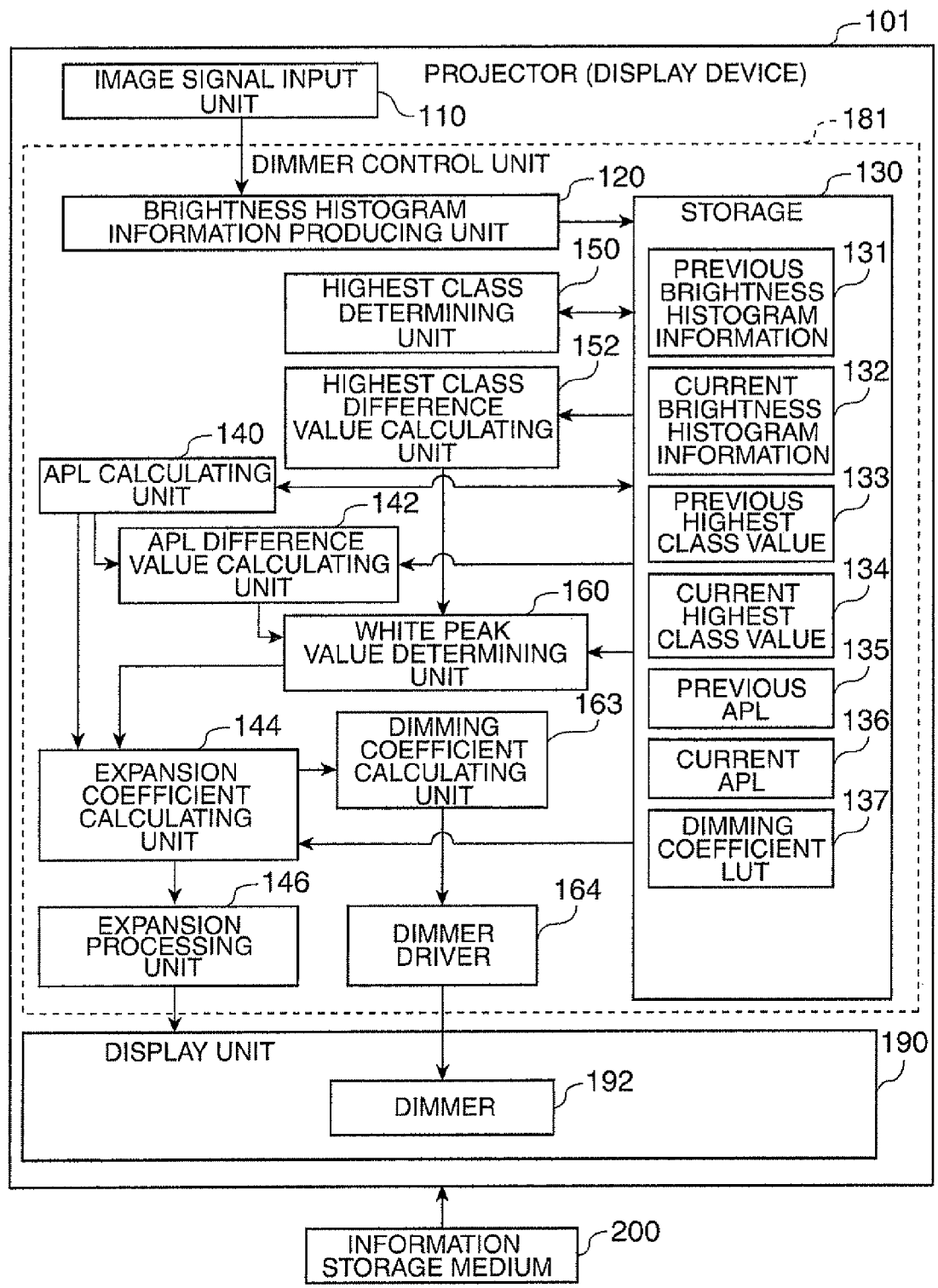
FIG. 9 is a functional block diagram of a projector according to a fourth embodiment.

FIG. 9 is a functional block diagram of a projector 101 according to a fourth embodiment. In addition, FIG. 10 is a view illustrating an example of an expansion coefficient LUT 137 in the fourth embodiment.

A dimming coefficient calculating unit 163 included in a dimmer control unit 181 of the projector 101 calculates a dimming coefficient on the basis of an expansion coefficient calculated by an expansion coefficient calculating unit 144. Moreover, a storage 130 does not store the dimming coefficient LUT 138. Since the other configuration except for those described above is the same as that in the first embodiment, the explanation will be omitted.

Figure 10:
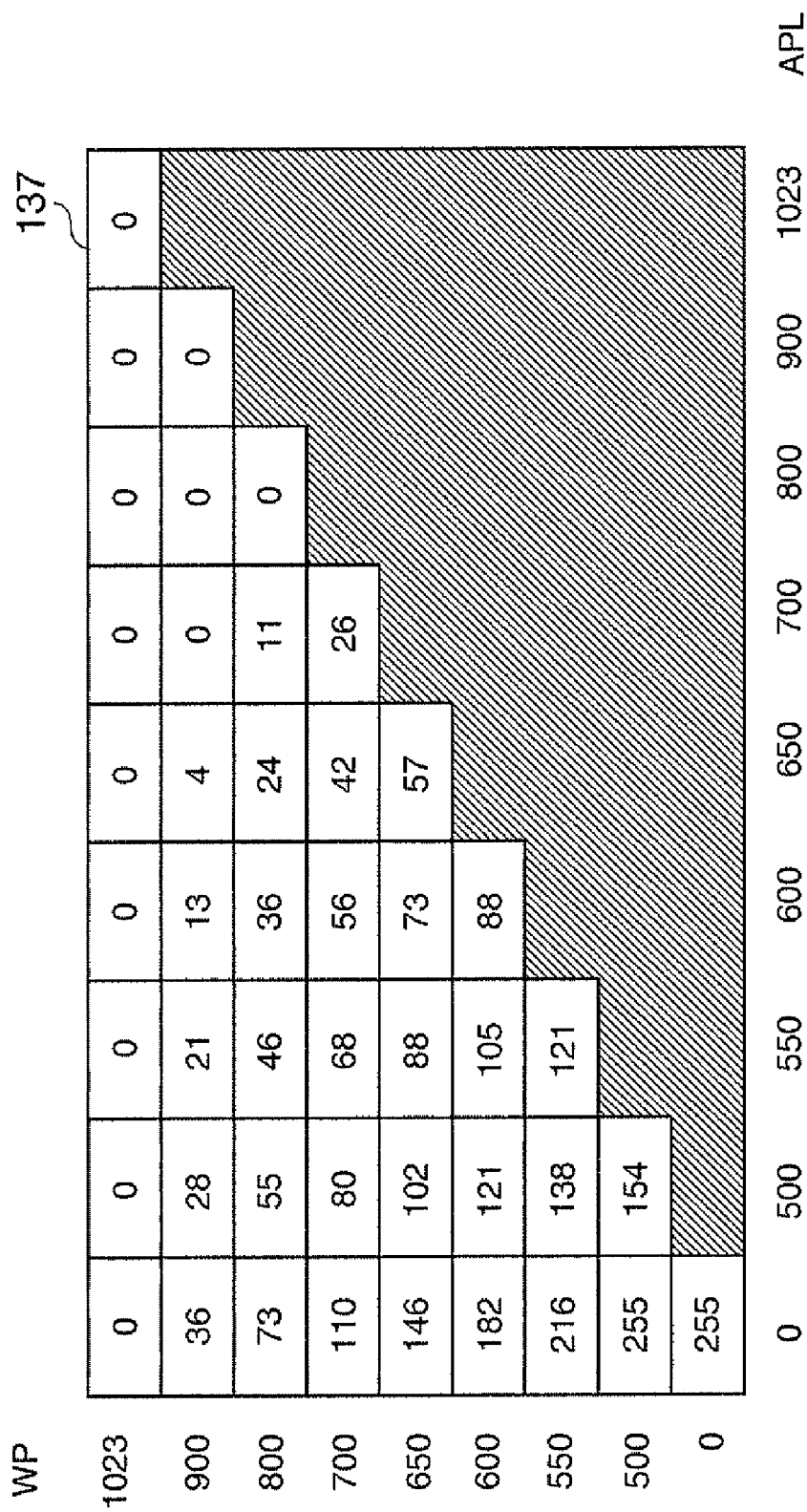
FIG. 10 is a view illustrating an example of an expansion coefficient LUT in the fourth embodiment.

In addition, expansion rate=1+expansion coefficient/255, and the expansion coefficient is values shown in the expansion coefficient LUT 137 of FIG. 10. Moreover, in the case of combination of a white peak value (WP) and an APL not defined in FIG. 10, the expansion coefficient is calculated by an interpolation operation. In addition, any value (for example, 500, 550, etc.) may be used as a reference and is not limited to the values shown in FIG. 10.

More specifically, the dimming coefficient calculating unit 163 calculates a dimming coefficient by raising the expansion rate to the (−2.2)-th power. For example, when the APL is 500 and the white peak value is 700, the expansion coefficient is 80. Accordingly, dimming coefficient=$(1+80/255)^{-2.2}$=0.55. In this case, the dimmer driver 164 drives the dimmer 192 such that the brightness becomes 55% of that in the case of complete white.

As described above, according to the present embodiment, in the projector 101, it is not necessary to store the dimming coefficient LUT 138 in the storage 130. As a result, since the storage capacity of the storage 130 can be reduced, the operation amount in calculating the dimming coefficient can be reduced.

Fifth Embodiment

The configuration of the expansion coefficient calculating unit is not limited to the configuration where the expansion coefficient is calculated on the basis of the APL of the current frame and the white peak value of the current frame but may be a configuration where the expansion coefficient is calculated on the basis of a dimming coefficient.

Figure 11:
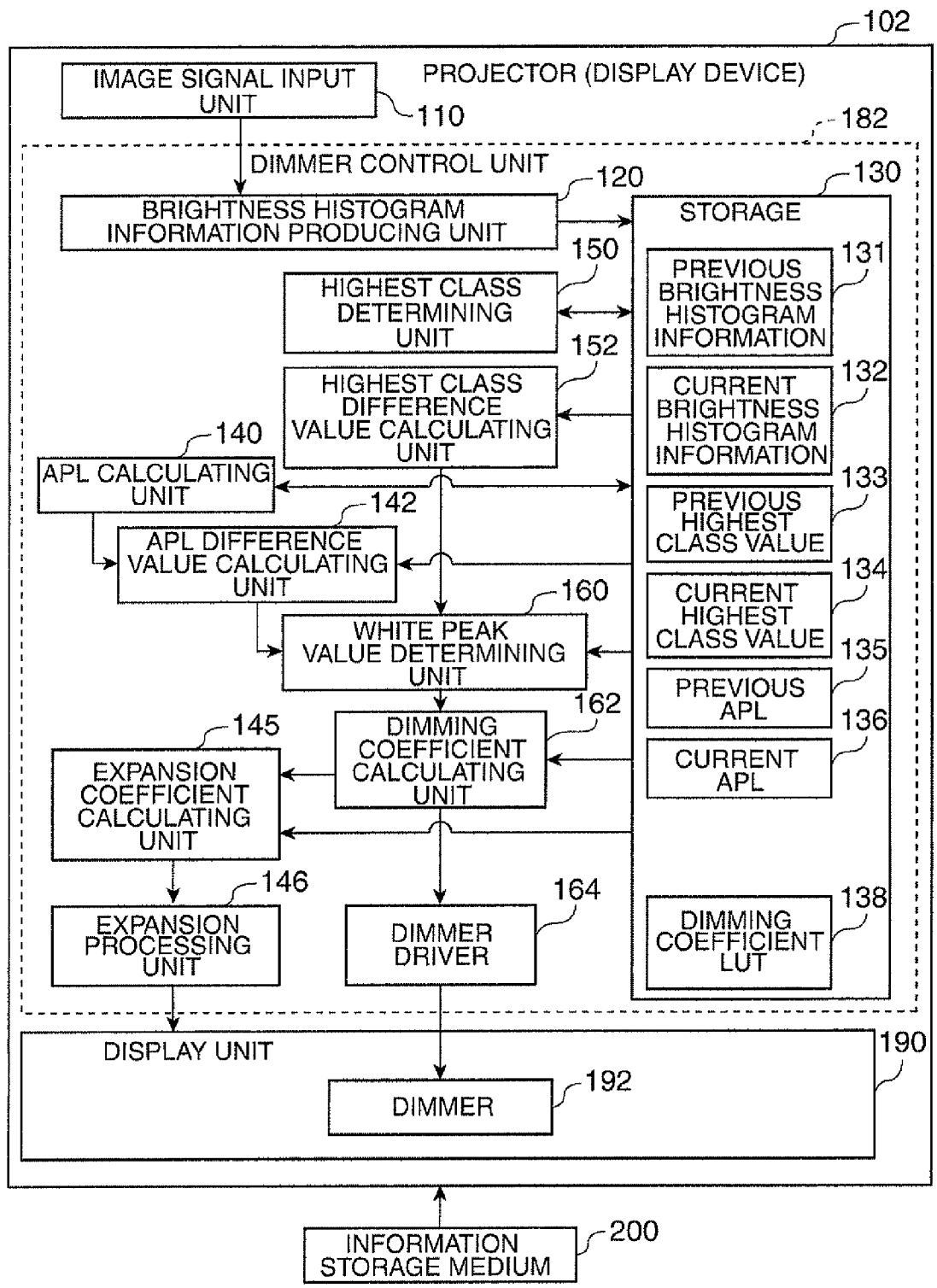
FIG. 11 is a functional block diagram of a projector according to a fifth embodiment.
Figure 12:
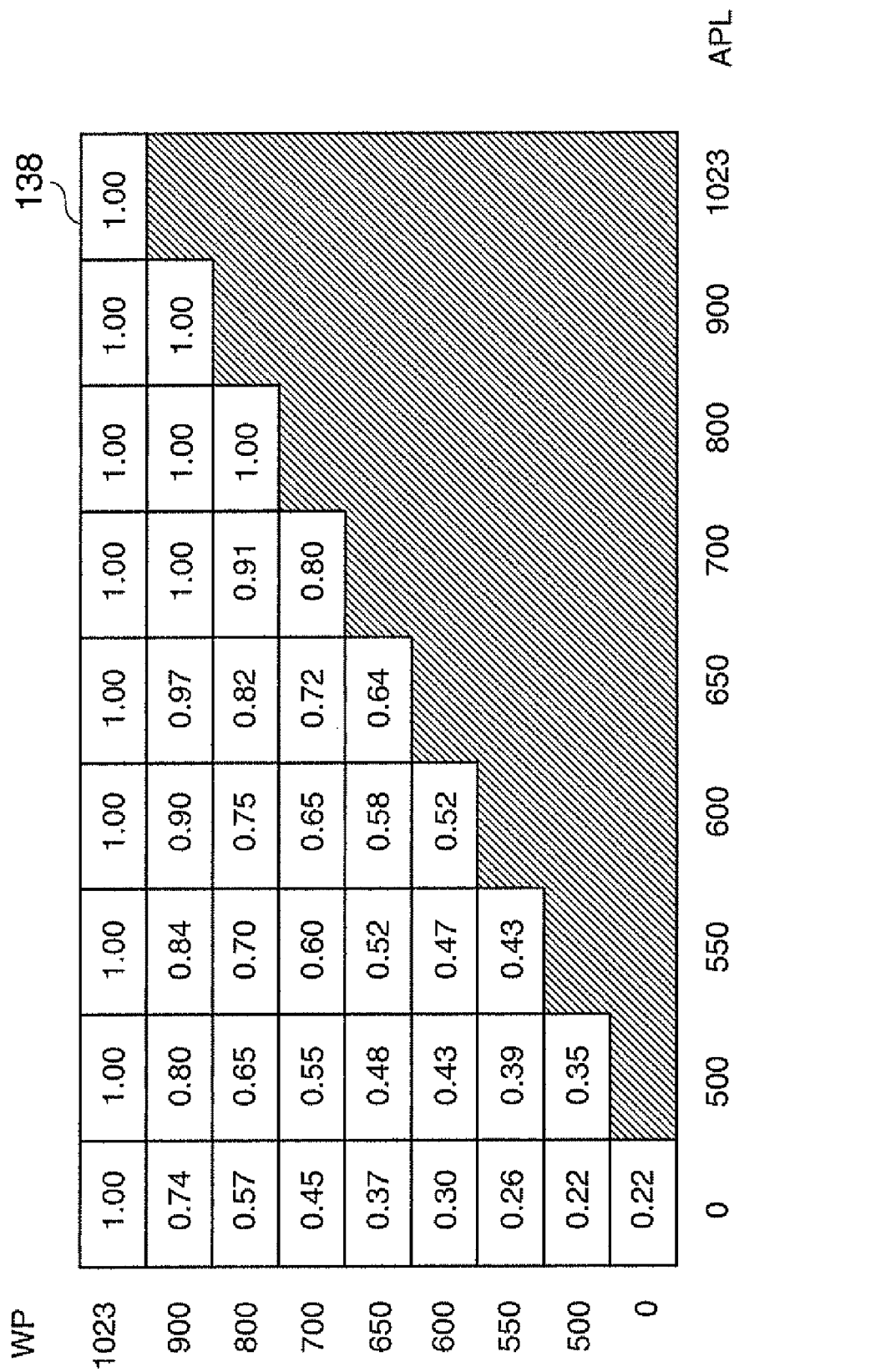
FIG. 12 is a view illustrating an example of a dimming coefficient LUT in the fifth embodiment.

FIG. 11 is a functional block diagram of a projector 102 according to a fifth embodiment. Moreover, FIG. 12 is a view illustrating an example of a dimming coefficient LUT 138 in the fifth embodiment.

An expansion coefficient calculating unit 145 included in a dimmer control unit 182 of the projector 102 calculates an expansion coefficient on the basis of a dimming coefficient calculated by a dimming coefficient calculating unit 162. Moreover, a storage 130 does not store the expansion coefficient LUT 137. Since the other configuration except for those described above is the same as that in the first embodiment, the explanation will be omitted.

In addition, the dimming coefficient represents the rate of light amount when complete white is set to 1. For example, when the APL is 500 and the white peak value is 700, the dimming coefficient is 0.55. In addition, dimming coefficients shown in FIG. 12 are values obtained by rounding off the third decimal place, and the number of effective figures is arbitrary. Moreover, any value (for example, 500, 550, etc.) may be used as a reference and is not limited to the values shown in FIG. 12. In addition, the dimming coefficient LUT 138 may be defined by integers, and the dimming coefficient may be calculated by a predetermined operation (for example, defined value of dimming coefficient LUT 138/ 255).

More specifically, the expansion coefficient calculating unit 145 calculates an expansion rate by raising a dimming coefficient to the (−1/2.2)-th power and calculates an expansion coefficient on the basis of the expansion rate. For example, when the APL is 550 and the white peak value is 650, the dimming coefficient is 0.52. Accordingly, expansion rate=$0.52^{-1/2.2}$=1.34, and expansion coefficient=255×(expansion rate−1)=255×0.34=87.

As described above, according to the present embodiment, in the projector 102, it is not necessary to store the expansion coefficient LUT 137 in the storage 130. As a result, since the storage capacity of the storage 130 can be reduced, the operation amount in calculating the expansion coefficient can be reduced.

Other Embodiments

In addition, applications of the invention are not limited to the embodiments described above, but various modifications thereof may also be made. For example, an object whose brightness is to be measured is not limited to the middle block 320 but may be the entire image 300. In addition, the number of pixel blocks 310 or the number of pixel blocks 310 included in the middle block 320 is not limited to the embodiment described above.

In addition, the projector 100 can execute brightness range expansion processing and dimming control processing simultaneously, and the procedure is not limited to the example shown in FIG. 2. In addition, the projector 100 may store either the expansion coefficient LUT 137 or the dimming coefficient LUT 138 and calculate the other coefficient (for example, a dimming coefficient) on the basis of a coefficient (for example, an expansion coefficient) calculated by using one of the LUTs, or may calculate an expansion coefficient and a dimming coefficient using a function or the like without storing the expansion coefficient LUT 137 and the dimming coefficient LUT 138.

In addition, the number of classes is not limited to 16, but any number in which a plurality of brightness values belong to one class may be applied. In addition, any value (for example, $\alpha 0=2$, $\alpha 1=1.5$, $\alpha 0=1.2$, etc.) that satisfies the size relationship may be applied as values of the $\alpha 0$ to $\alpha 5$.

In addition, the predetermined value added to the white peak value of the previous frame when the highest class difference absolute value is less than the threshold value is not limited to the value obtained by multiplying the APL difference value by the coefficient $\alpha$ but may be an APL difference value or a constant, for example.

In addition, the predetermined operation executed when the highest class difference absolute value is equal to or larger than the threshold value is not limited to the operation expression described in the first embodiment but may be WP(t)=RMin(t)+dWP(t), for example. In this case, dWP(t) is an integer of 0 or more and 63 or less.

In addition, the projector 100 is not limited to an LCD projector (transmissive type, or reflective type such as LCOS) but may be a projector using the DMD (Digital Micromirror Device), for example. In addition, the 'DMD' is a trademark of Texas Instruments, Inc., USA. In addition, functions of the projector 100 may be realized by distributing them to a plurality of apparatuses (for example, a PC, a projector, etc.).

In addition, a display device in which the dimmer control unit 180 can be mounted is not limited to the projector 100, but various display devices having a brightness control function and a dimming control function, such as a television and a monitor, may be applied.

What is claimed is:

1. 1 A display device comprising:
   a brightness histogram information producing unit that produces brightness histogram information on the basis of an image signal;
   a highest class determining unit that determines a highest class, which is a class with a highest brightness, on the basis of the brightness histogram information; and
   a white peak value determining unit that determines a white peak value of a current frame by adding a predetermined value to a white peak value of a previous frame when a highest class difference absolute value, which is an absolute value of a difference value between a highest class of the previous frame and a highest class of the current frame, is less than a threshold value and that determines a white peak value of the current frame by performing a predetermined operation regardless of a white peak value of the previous frame when the highest class difference absolute value is equal to or larger than the threshold value.

2. The display device according to claim 1, further comprising:
   an APL (average picture level) calculating unit that calculates an APL on the basis of the brightness histogram information; and
   an APL difference value calculating unit that calculates an APL difference value which is a difference value between an APL of a previous frame and an APL of a current frame.

3. The display device according to claim 1, wherein the brightness histogram information producing unit produces the brightness histogram information so as to include a plurality of brightness value in each class.

4. The display device according to claim 2, further comprising:
   an expansion coefficient calculating unit that calculates an expansion coefficient on the basis of the APL of the current frame and the white peak value of the current frame.

5. The display device according to claim 2, further comprising:
   a dimming coefficient calculating unit that calculates a dimming coefficient on the basis of the APL of the current frame and the white peak value of the current frame.

6. The display device according to claim 4, further comprising:
   a dimming coefficient calculating unit that calculates a dimming coefficient on the basis of the expansion coefficient.

7. The display device according to claim 5, further comprising:
   an expansion coefficient calculating unit that calculates an expansion coefficient on the basis of the dimming coefficient.

8. The display device according to claim 2,
   wherein the white peak value determining unit applies, as the predetermined value, a value obtained by multiplying the APL difference value by a coefficient $\alpha$.

9. The display device according to claim 8,
   wherein the white peak value determining unit determines the white peak value of the current frame by applying a different value as the coefficient $\alpha$ according to combination of a highest class difference value, which is a difference value between a highest class of a previous frame and a highest class of a current frame, and the APL difference value.

10. The display device according to claim 9,
    wherein the white peak value determining unit applies $\alpha 0$ as the coefficient $\alpha$ when the highest class difference value is 0 or more and the APL difference value is 0 or more, applies $\alpha 1$ as the coefficient $\alpha$ when the highest class difference value is 0 or more and the APL difference value is less than 0, applies 0 as the coefficient $\alpha$ when the highest class difference value is less than 0 and the APL difference value is 0 or more, and applies $\alpha 2$ as the coefficient a when the highest class difference value is less than 0 and the APL difference value is less than 0 (where, $\alpha 0>\alpha 1>\alpha 2$).

11. The display device according to claim 9,
    wherein the white peak value determining unit applies $\alpha 3$ as the coefficient a when the APL difference value is larger than 0 and the highest class difference value is larger than 0, applies $\alpha 4$ as the coefficient $\alpha$ when the APL difference value is larger than 0 and the highest class difference value is 0 or less, apples 0 as the coefficient $\alpha$ when the APL difference value is 0 or less and the highest class difference value is larger than 0, and applies $\alpha 5$ as the coefficient $\alpha$ when the APL difference value is 0 or less and the highest class difference value is 0 or less (where, $\alpha 3>\alpha 4>\alpha 5$).

12. The display device according to claim 2,
wherein the APL calculating unit calculates a value obtained by dividing the sum of values, which are obtained by multiplication of index values of classes whose frequencies are 1 or more and the frequencies of the classes, by the sum of the frequencies as the APL on the basis of the brightness histogram information.

13. The display device according to claim 11,
wherein the APL calculating unit calculates the APL by using as the index value a maximum brightness value of each class whose frequency is 1 or more.

14. A non-transitory CRM having a program stored thereon causing a computer to perform the method steps, the method steps comprising:
producing brightness histogram information on the basis of an image signal;
determining a highest class, which is a class with a highest brightness, on the basis of the brightness histogram information; and
determining a white peak value of a current frame by adding a predetermined value to a white peak value of a previous frame when a highest class difference absolute value, which is an absolute value of a difference value between a highest class of the previous frame and a highest class of the current frame, is less than a threshold value and that determines a white peak value of the current frame by performing a predetermined operation regardless of a white peak value of the previous frame when the highest class difference absolute value is equal to or larger than the threshold value.

15. An information storage medium that stores a program readable by a computer,
wherein the program according to claim 14 is stored.

16. An adaptive dimming control method, the method comprising:
producing brightness histogram information on the basis of an image signal;
determining a highest class, which is a class with a highest brightness, on the basis of the brightness histogram information; and
determining a white peak value of a current frame by adding a predetermined value to a white peak value of a previous frame when a highest class difference absolute value, which is an absolute value of a difference value between a highest class of the previous frame and a highest class of the current frame, is less than a threshold value and that determines a white peak value of the current frame by performing a predetermined operation regardless of a white peak value of the previous frame when the highest class difference absolute value is equal to or larger than the threshold value.

\* \* \* \* \*